United States Patent [19]
Spatafora

[11] Patent Number: 5,842,558
[45] Date of Patent: Dec. 1, 1998

[54] PRODUCT TRANSLATING DEVICE

[75] Inventor: Mario Spatafora, Bologna, Italy

[73] Assignee: Azionaria Costruzioni Macchine Automatiche A.C.M.A. S.p.A., Bologna, Italy

[21] Appl. No.: 555,330

[22] Filed: Nov. 8, 1995

[30] Foreign Application Priority Data

Nov. 11, 1994 [IT] Italy .......................... BO94 A 000494

[51] Int. Cl.⁶ ................................................ B65G 25/02
[52] U.S. Cl. ..................................... 198/468.01; 198/740
[58] Field of Search ............................. 198/468.01, 740; 493/125, 126, 127, 177, 183, 453

[56] References Cited

U.S. PATENT DOCUMENTS

| | | | |
|---|---|---|---|
| 2,818,157 | 12/1957 | Howell | 198/740 |
| 2,935,917 | 5/1960 | Randles, Jr. | 493/126 |
| 2,950,804 | 8/1960 | Ardner | 198/740 |
| 3,151,727 | 10/1964 | Glaubke | 198/468.1 |
| 3,375,761 | 4/1968 | Fulton | 493/127 |
| 3,827,549 | 8/1974 | Hunter | 198/740 |
| 4,067,436 | 1/1978 | Davies et al. | 198/468.1 |
| 4,123,966 | 11/1978 | Buschor | 493/127 |
| 4,164,278 | 8/1979 | Gurioli | 198/468.1 |
| 4,200,180 | 4/1980 | Dixon | 198/468.1 |
| 4,219,112 | 8/1980 | Loewenthal | 198/740 |
| 4,422,282 | 12/1983 | Marchetti | 493/183 |
| 4,589,812 | 5/1986 | Meives et al. | 198/740 |
| 4,830,653 | 5/1989 | Montemayor-Quiroga et al. | 65/260 |
| 5,021,041 | 6/1991 | Pigeau et al. | 493/177 |
| 5,547,064 | 8/1996 | Meyer et al. | 198/468.1 |

FOREIGN PATENT DOCUMENTS

| | | |
|---|---|---|
| 2520518 | 11/1976 | Germany . |
| 583139 | 12/1976 | Switzerland . |
| 2003439 | 3/1979 | United Kingdom . |

Primary Examiner—William E. Terrell
Assistant Examiner—Khoi H. Tran
Attorney, Agent, or Firm—Ladas & Parry

[57] ABSTRACT

A pusher that translates products (3) along a straight first path (4) extending along a substantially horizontal conveying surface (5) has a transmission assembly (21) for moving the pusher (8) along a closed second path (11) having a conveying portion coincident with the first path (4) from the input to the output ends (6,7) and a return portion (12) outside the first path (4). The pusher (8) is connected to the transmission assembly (21) so as to maintain a constant angular position in relation to the straight conveying direction (4a) along the first path (4), and oscillate about a first axis (30) that is crosswise to the second path (11) when moving along the return portion (12) of the second path (11).

18 Claims, 3 Drawing Sheets

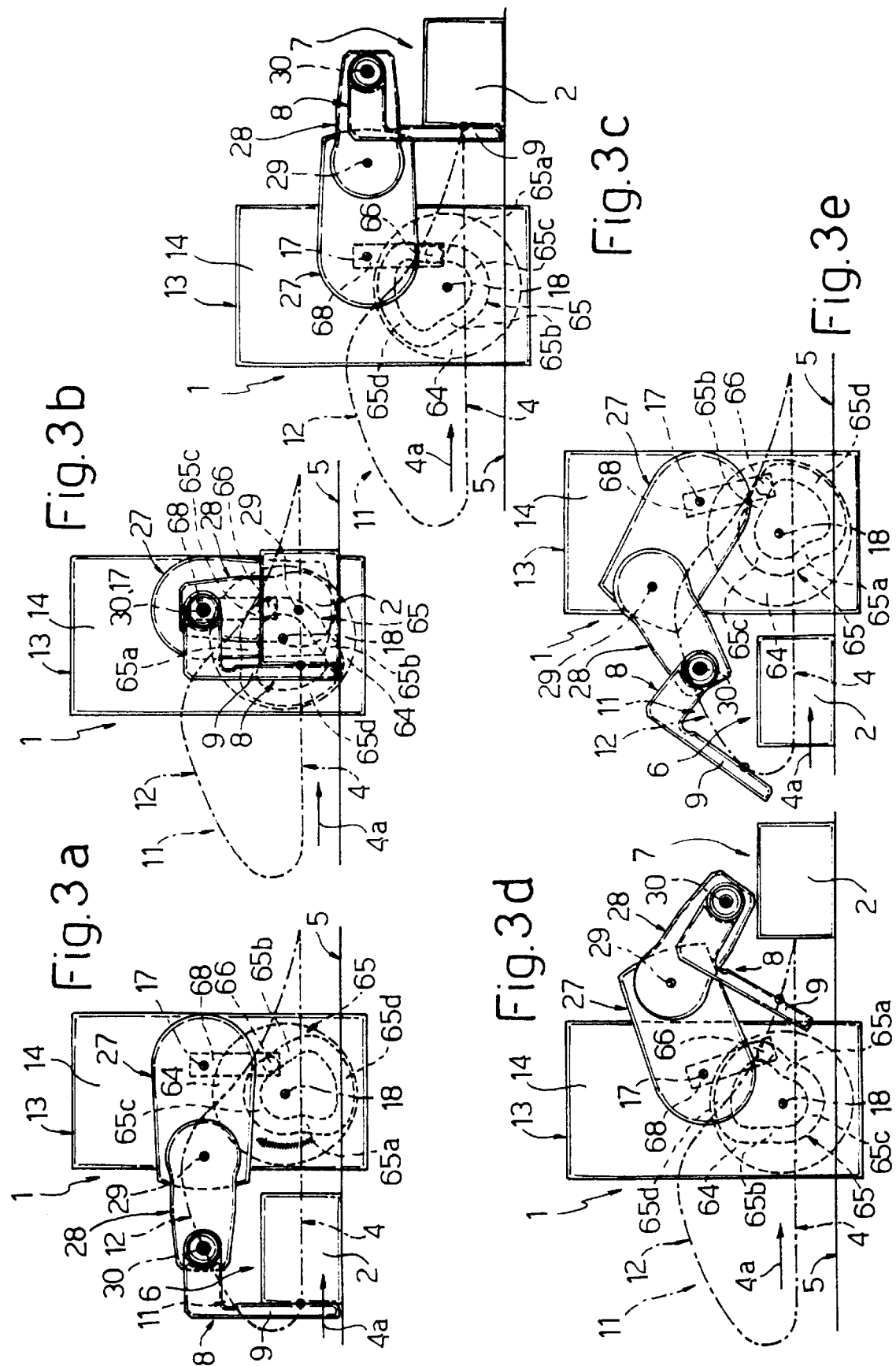

PRODUCT TRANSLATING DEVICE

BACKGROUND OF THE INVENTION

The present invention relates to a product translating device.

Numerous mechanisms are used in a wide variety of fields for translating a succession of products in general, and a succession of superimposed groups of products in particular, along a straight path on a substantially horizontal conveying surface.

The most straightforward known devices obviously comprise a pusher moving back and forth along the path, between an engage position in which it successively engages the products at the start of the path, and a release position at the end of the path. A major drawback of known devices of this type is that, at the end of its return travel, the pusher invariably engages or moves through the engage position, so that the products can only be fed into the engage position at the end of each operating cycle.

SUMMARY OF THE INVENTION

It is an object of the present invention to provide a translating device which not only provides for overcoming the above drawback, but is also particularly suitable for conveying, without deforming them, superimposed groups of products arranged in a given order.

According to the present invention, there is provided a translating device for translating products along a straight first path extending along a substantially horizontal conveying surface; the device comprising a pusher, and activating means for moving the pusher along said first path in a given conveying direction; characterized in that said activating means comprise a transmission assembly for moving the pusher along a closed second path in turn comprising a conveying portion coincident with said first path, and a return portion extending outside the first path and from the output end to the input end of the first path; the pusher being connected to said transmission assembly so as to translate along the second path while maintaining a constant given angular position in relation to the conveying surface; and control means being associated with the transmission assembly, for oscillating the pusher, in use, to and from said given angular position about a first axis crosswise to the second path, and as the pusher travels along the return portion.

According to a preferred embodiment of the above device, said given angular position is a position crosswise to said conveying surface; the control means being so formed as to position the pusher, at any point along the return portion, so that it is inclined in the opposite direction to said conveying direction and in relation to said given angular position.

BRIEF DESCRIPTION OF THE DRAWINGS

A non-limiting embodiment of the present invention will be described by way of example with reference to the accompanying drawings, in which:

FIGS. 3A to 3E show a smaller-scale views of the FIG. 1 device in various operating positions.

DETAILED DESCRIPTION OF THE INVENTION

Figure 1:
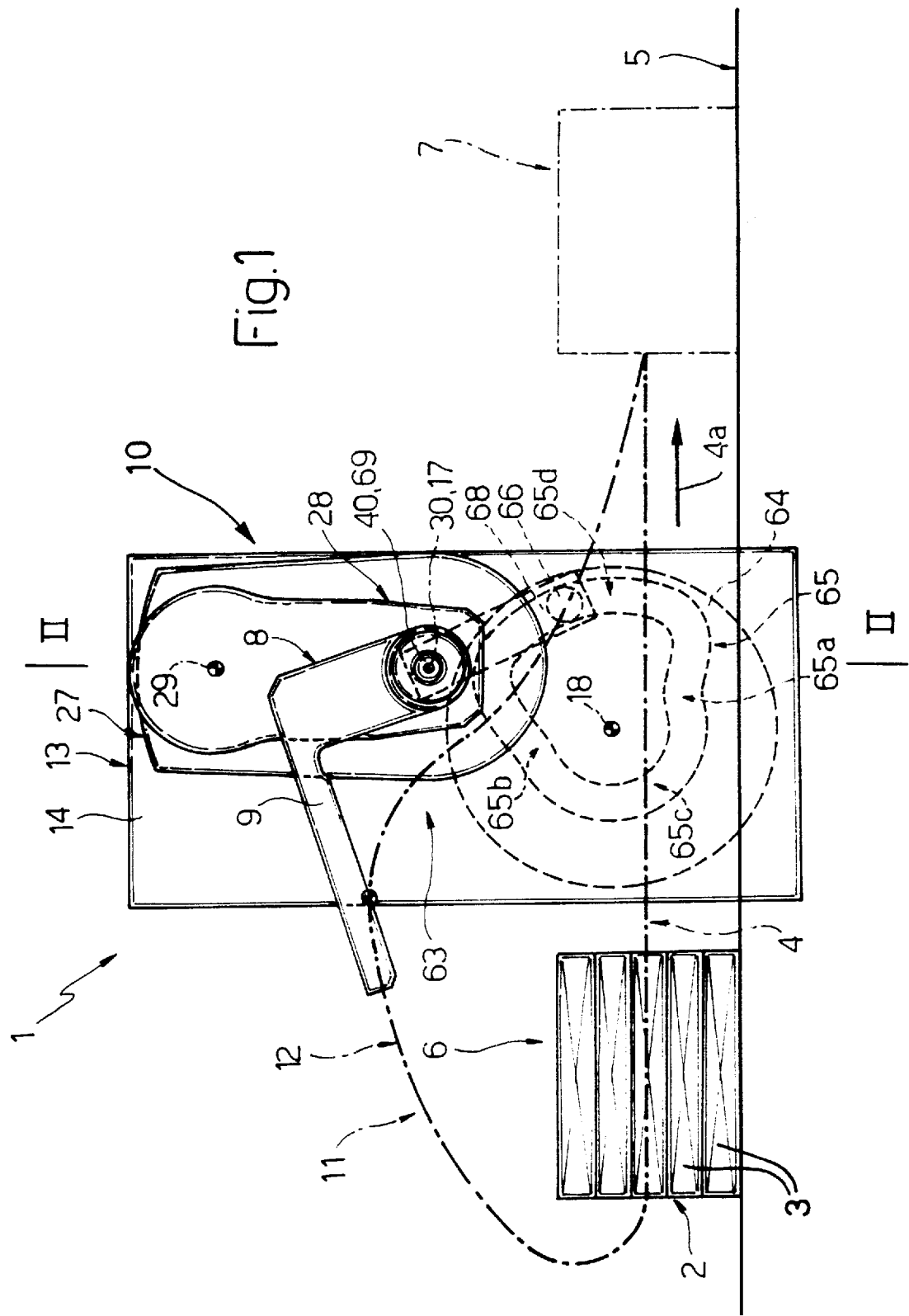
FIG. 1 shows a side view of a translating device in accordance with the present invention.

Number 1 in FIG. 1 indicates a translating device for translating groups 2 of products 3 along a straight path 4 extending along a substantially horizontal conveying surface 5 between an input station 6 and an output station 7.

Device 1 comprises a pusher 8 comprising the end arm of a substantially L-shaped blade 9; and an articulated device 10 for moving pusher 8 between stations 6 and 7 along an annular path 11 comprising a conveying branch coincident with path 4, and a return branch 12 extending from station 7 to station 6 and over path 4.

Figure 2:
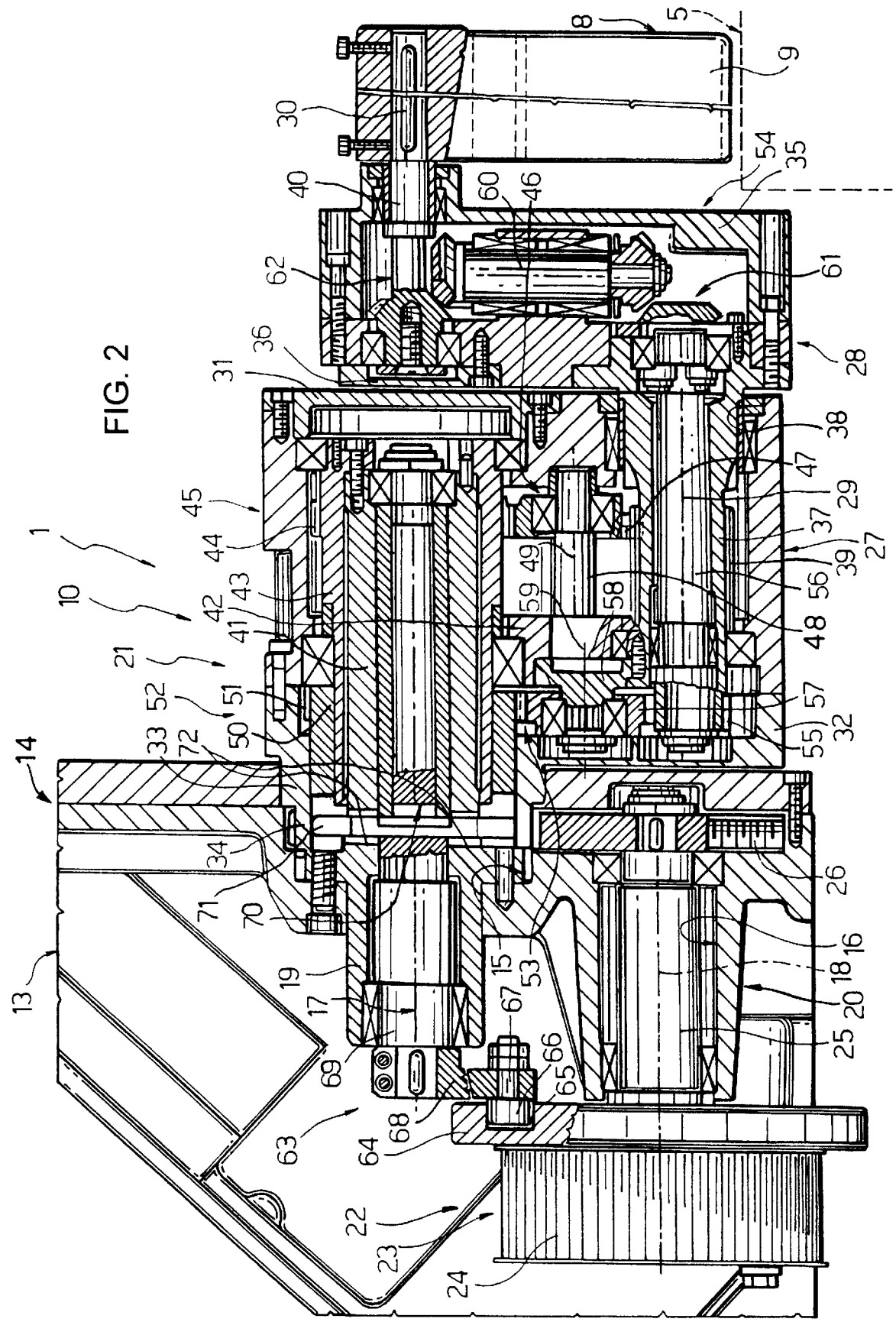
FIG. 2 shows a larger-scale section along line II—II in FIG. 1.

With reference to FIGS. 1 and 2, device 10 comprises a fixed frame 13 in turn comprising a vertical plate 14 parallel to path 4 and presenting two holes 15 and 16 located the first over the second and coaxial with respective axes 17 and 18; and two sleeves 19 and 20, the first of which partly engages hole 15, is connected integral with plate 14, and is coaxial with hole 15, and the second of which is integral with plate 14 and coaxial with hole 16.

Device 10 also comprises a transmission assembly 21 fitted to frame 13 and rotated about axis 17 by a respective drive 22 comprising a belt drive 23, the output pulley 24 of which is fitted to a shaft 25 mounted for rotation through sleeve 20 and fitted on its free end with a gear 26.

Assembly 21 comprises a first arm 27 fitted at a first end to frame 13 so as to rotate anticlockwise (in FIG. 3) about axis 17; and a second arm 28, a first end of which is connected to the second end of arm 27 to permit arm 28 to rotate in relation to arm 27 about an axis 29 parallel to and located a given distance of other than zero from axis 17. The second end of arm 28 is connected to one end of blade 9 to permit blade 9 to rotate in relation to arm 28 about an axis 30 parallel to axis 17 and located at a distance from axis 29 equal to that between axis 29 and axis 17.

As shown in FIG. 2, arm 27 comprises an elongated box body in turn comprising an annular lateral wall perpendicular to plate 14, and two end walls 31 and 32 parallel to plate 14. Wall 32 faces plate 14 and presents an integral tubular appendix 33 extending through wall 32 and mounted coaxial with axis 17 so as to partly engage hole 15. Appendix 33 presents external teeth defining a gear 34 meshing with gear 26 with a 1:1 gear ratio.

Arm 28 comprises an elongated box body in turn comprising an annular lateral wall perpendicular to plate 14, and two end walls 35 and 36 parallel to plate 14. Wall 36 faces wall 35 and plate 14, and presents an integral tubular appendix 37 extending through wall 36 and mounted coaxial with axis 29. Appendix 37 extends outwards of wall 36 to engage in rotary manner a hole 38 formed through wall 31 coaxially with axis 29, and presents external teeth defining a gear 39 inside arm 27. Walls 35 and 36 present through holes coaxial with axis 30 and engaged in rotary manner by two portions of a shaft 40, an end portion of which projects outwards of wall 35 and is fitted with pusher 8.

At the end facing arm 27, sleeve 19 presents a tubular appendix 41 which penetrates arm 27 through appendix 33, and extends through a partition 42 extending through arm 27 and parallel to walls 31 and 32. Appendix 41 is fitted integral with a sleeve 43 connected in rotary manner to wall 31 and partition 42, and presenting external teeth defining a gear 44. Together with sleeves 43 and 19 and appendix 41, gear 44 is fixed in relation to wall 14, and forms the input of a transmission 45 for rotating arm 28 in relation to arm 27 and comprising an epicyclic gear train 46, of which gear 44 forms the sun gear, arm 27 forms the carrier, and gear 39 forms the only planet gear, which is connected to gear 44 by an idle gear 47 fitted to a shaft 48 in turn fitted to wall 31 and partition 42 to permit gear 47 to rotate about an axis 49 parallel to axis 17. Gears 44 and 39 are such as to rotate arm 28 clockwise (in FIGS. 3A to 3E) about axis 29 with a gear ratio of 1:2 in relation to arm 27; and gears 44, 47 and 39 mesh in such a manner that the plane defined, in use, by axes 17 and 30 is parallel at all times to surface 5.

Sleeve 43 is fitted with a rotary tubular body 50, which presents external teeth defining a gear 51 and forming the input of a transmission 52. A first portion of transmission 52 comprises an epicyclic gear train 53, of which gear 51 forms the sun gear; and a second portion of transmission 52 comprises a parallel-axis transmission 54, of which shaft 40 forms the output element.

In addition to gear 51, gear train 53 also comprises a planet gear 55 fitted to a shaft 56 extending in rotary manner through appendix 37 and coaxially with axis 29; and an idle gear 57 fitted in rotary manner to a shaft 58 integral with partition 42 and coaxial with an axis 59 parallel to axis 17. Transmission 54 comprises a shaft 60 mounted for rotation inside arm 28, perpendicular to axes 29 and 30, and connected at one end to shaft 56 and at the other end to shaft 40 by respective bevel gear pairs 61 and 62.

Gears 51, 55 and bevel gear pairs 61, 62 are such as to rotate pusher 8 anticlockwise (in FIGS. 3A to 3E) about axis 30 with a 1:3 gear ratio in relation to arm 27.

Device 1 comprises a control assembly 63 for varying rotation of pusher 8 about axis 30 along the portion of path 11 corresponding to path 4.

Assembly 63 comprises a cam 64 fitted to shaft 25 and presenting, on the side facing plate 14, an annular track or groove 65 extending about axis 18 and engaged by a tappet roller 66 fitted in rotary manner to a shaft 67 parallel to axis 17; which shaft 67 is fitted to a lever 68 in turn fitted to one end of a shaft 69 coaxial with axis 17 and fitted in rotary manner through sleeve 19 and appendix 41. Groove 65 comprises two diametrically-opposed concave portions 65a, 65b connecting two circular portions 65c, 65d coaxial with axis 18, and of which portion 65c presents a smaller radius than portion 65d. When travelled along, in use, by roller 66, portions 65a and 65b therefore rotate gear 51 by the same amount but in opposite directions about axis 17, thus similarly rotating pusher 8 about axis 30; whereas, when travelled along by roller 66, circular portions 65c and 65d maintain pusher 8 in two respective distinct angular positions.

Shaft 69 presents a diametrical hole 70 engaged by a pin 71, the opposite ends of which engage in sliding manner circular openings 72 formed through sleeve 41, and radial holes formed through tubular body 50, so that tubular body 50 is angularly integral with shaft 69.

With reference to FIGS. 3A to 3E, one complete cycle of device 1 will now be described as of the instant in which (FIG. 3A) pusher 8 is positioned with blade 9 perpendicular to surface 5, and contacting a group 2 of products at input station 6; drive assembly 22 (FIG. 2) activates arm 27; and transmission 23 rotates shaft 25 clockwise at constant angular speed, so that tappet roller 66 of control assembly 63 is located at the leading end of portion 65c in the clockwise rotation direction of cam 64.

Before going on to describe the operating cycle of device 1, however, it should be pointed out that, as a consequence of the gear ratio of arms 27 and 28, and the equal distance of axes 17 and 30 from axis 29, for each complete turn of axis 29 anticlockwise (in FIGS. 3A to 3E) about axis 17 and, hence, in relation to surface 5, axis 30 makes a complete clockwise turn about axis 29 and in relation to surface 5, and moves back and forth along a plane through axis 17. If, as in device 1 described, pusher 8 is to be moved parallel to surface 5 along at least part of path 11, and, hence, the plane travelled along by axis 30 is to be parallel to surface 5, arms 27 and 28 need simply be so connected as to be positioned in line with each other and parallel to surface 5 (FIG. 3A).

A further point to note is that, if assembly 63 is deactivated, the gear ratio of arm 27 and pusher 8 is such as to maintain pusher 8 in a fixed angular position in relation to surface 5. If, as in device 1 described, pusher 8 is to be maintained with blade 9 perpendicular at all times to surface 5, pusher 8 need simply be so connected to arm 28 that blade 9 is perpendicular to arm 28 when arms 27 and 28 are in line with each other (FIG. 3A).

In actual use, when pusher 8 moves from station 6 to station 7 along straight path 4 (FIGS. 3A, 3B, 3C) and in work direction 4a, tappet roller 66 rolls along the circular, smaller-radius portion 65c of groove 65, so that pusher 8 is maintained parallel to itself and perpendicular to surface 5 until roller 66 reaches the leading end of portion 65a.

As it rolls along portion 65a (FIG. 3C) of groove 65 from smaller-radius portion 65c to larger-radius portion 65d, roller 66 moves away from axis 18 of cam 64 so as to rotate lever 68 anticlockwise (in FIGS. 3A to 3E) and so rotate pusher 8 clockwise (in FIG. 3) about axis 30, i.e. in the opposite direction to direction 4a.

In other words, on reaching station 7, and as a result of the above rotation, blade 9 of pusher 8 is moved backwards (FIG. 3D) and is detached from group 2 just before pusher 8 is raised towards station 6, thus preventing blade 9 from colliding with group 2 at the start of its return movement.

By the time roller 66 leaves portion 65a, blade 9 of pusher 8 is tilted backwards in relation to surface 5 by an angle approximately equal to but no less than 45°, and is maintained at this angle as roller 66 engages constant-radius portion 65d (FIGS. 3D, 3E), the angular extension of which is so defined as to maintain pusher 8 parallel to itself until it nears station 6.

Upon roller 66 engaging variable-radius portion 65b, lever 68 rotates shaft 69 clockwise until roller 66 reaches portion 65c (FIG. 3A); and pusher 8, after swinging over the next group 2 fed in the meantime into station 6, is again positioned with blade 9 perpendicular to surface 5, ready to repeat the above cycle.

In other words, assembly 63 provides for maintaining pusher 8 tilted backwards at each point along return branch 12, thus preventing it from interfering with the group 2 fed by pusher 8 into station 7, or with the next group 2 fed by a known feed device (not shown) into station 6 as soon as the foregoing group 2 is removed by pusher 8.

I claim:

1. A device (1) for translating products (3) along a straight first path (4) extending along a substantially horizontal conveying surface (5), the device (1) comprising:

a pusher (8) for translating products along a first path; and activating means (10) for moving the pusher (8) along a first path (4), which defines a straight conveying direction (4a) from an input end (6) to an output end (7), wherein the activating means (10) comprise a transmission assembly (21) for moving the pusher (8) along a closed second path (11) having a conveying portion coincident with the first path (4) from the input to the output ends (6,7) and a return portion (12) outside the first path (4), the pusher (8) being connected to the transmission assembly (21) during the moving of the pusher along the first path (4) to maintain a constant angular position in relation to the straight conveying direction (4a), and control means (63) associated with the transmission assembly (21) for oscillating the pusher (8) from the angular position about a first axis (30) that is crosswise to the second path (11) during the moving of the pusher (8) along the return portion (12) of the second path (11), and wherein the transmission assembly (21) is an articulated transmission assembly (21) comprising a first arm (27) rotating a second arm (28) supporting the pusher (8) in rotary manner and connected to the first arm (27) so as to rotate, in relation to the first arm (27), about a third axis (29) parallel to the second axis (17) and movable with the first arm (27) about the second axis (17), said first arm (27) and said pusher (8) being mounted for rotation respectively about the second and first axes (17, 30) in a first rotation direction, and the second arm (28) being mounted for rotation about the third axis (29) in a second rotation direction opposite to the first rotation direction.

2. The device as claimed in claim 1, wherein the angular position is crosswise to the conveying surface (5) and the control means (63) is so formed that, at any point along the return portion (12) of the second path (11), the pusher (8) is tilted in a direction opposite to the conveying direction (4a).

3. The device as claimed in claim 1, wherein the first and second arms (27, 28) and the pusher (8) are so connected that, for each complete turn of the first arm (27) about the second axis (17) in the first rotation direction, the second arm (28) makes two turns about the third axis (29) in the second rotation direction and the pusher (8) makes three turns about the first axis (30) in the first rotation direction.

4. The device as claimed in claim 1, wherein the said first and second axes (30, 17) are located the same distance from the third axis (29) and the first and second arms (27, 28) are so located and connected to each other that the first and second axes (30, 17) are maintained at all times in a plane parallel to the conveying surface (5).

5. The device as claimed in claim 1, wherein the control means (63) are means for varying rotation of the pusher (8) about the first axis (30).

6. The device as claimed in claim 1, wherein the transmission assembly (21) comprises:

drive means (22) for rotating the first arm (27) about the second axis (17);

a first transmission (45) comprising a first epicyclic gear train (46) having a first sun gear (44) coaxial with the second axis (17), and a first planet gear (37) coaxial with the third axis (29) and integral with the second arm (28); and a second transmission (52) comprising a second epicyclic gear train (53) having a second sun gear (51) coaxial with the second axis (17), and a second planet gear (55) coaxial with the third axis (29), and a parallel-axis transmission (54) connecting the second planet gear (55) to the pusher (8).

7. The device as claimed in claim 6, wherein each of the epicyclic gear trains (46, 53) comprises an idle gear (47, 57) interposed between the relative sun gear (44, 51) and the relative planet gear (37, 55), the first arm (27) forming the carrier for both of the gear trains (46, 53) and supporting the idle gears (47, 57) for rotation.

8. The device as claimed in claim 6, wherein the said first sun gear (44) is fixed, and the second gun gear (51) is rotated about the second axis (17) by the control means (63).

9. The device as claimed in claim 8, wherein the control means (63) comprise cam means (64) associated with and for imparting to the second sun gear (51) an oscillation about the second axis (17).

10. The device as claimed in claim 9, wherein the cam means (64) are connected to the drive means (22) so as to rotate about a fourth axis (18) parallel to the second axis (17) and comprise a cam (64) having an annular track (65), a lever (68) pivoting about the second axis (17) and integral with the second sun gear (IS), and a tappet roller (66) fitted in rotary manner to the lever (68) and cooperating with the annular track (65), the annular track (65) comprising first and second concave portions (65a, 65b) alternating with first and second convex portions (65c, 65d) of different curvatures.

11. The device as claimed in claim 10, wherein the first and second convex portions (65c, 65d) are circular with different radii.

12. A translating device (1) for translating products (3) along a straight first path (4) extending along a substantially horizontal conveying service (5) and having an input end (6) and an output end (7), the device (1) comprising:

a pusher (8) and activating means (10) for moving the pusher (8) along said first path (4) in a given conveying direction (4a); said activating means (10) comprising a transmission assembly (21) for moving the pusher (8) along a closed second path (11) in turn comprising a conveying portion coincident with said first path (4), and a return portion (12) extending outside the first path (4) and from said output end (7) to said input end (6); the pusher (8) being connected to said transmission assembly (21) for maintaining a constant given angular position in relation to the conveying surface (5) during movement along said first path (4); control means (63) being associated with the transmission assembly (21) for oscillating the pusher (8) in use to and from said given angular position about a movable first axis (30) crosswise to the second path (11) and as the pusher (8) travels along the return portion (12); said transmission assembly (21) being an articulated transmission assembly (21) comprising a first arm (27) rotating about a fixed second axis (17) parallel to the first axis (30) and a second arm (28) supporting the pusher (8) in a rotary manner; said movable first axis (30) being movable with said second arm (28), which is connected to the first arm (27) so as to rotate in relation to the first arm (27) about a movable third axis (29) parallel to the second axis (17) and movable with the first arm (27) about the second axis (17), whereby the pusher (8) is supported in a rotary manner by the second arm (28) for rotating in relation to the second arm (28) about the first axis (30), said first axis being movable with the second arm (28) about the third axis (29).

13. A device as claimed in claim 12, wherein said given angular position is crosswise to said conveying surface (5); the control means (63) being so formed that, at any point along said return portion (12), the pusher (8) is tilted in the opposite direction to said conveying direction (4a) and in relation to said given angular position.

14. A device as claimed in claim 12, wherein said first arm (27) and said pusher (8) rotate about the respective second and first axes (17, 30) in a first rotation direction, and the second arm (28) rotates about the third axis (29) in a second rotation direction opposite to the first rotation direction.

15. A device as claimed in claim 12, wherein said first and second arms 927, 28) and said pusher (8) are so connected that, for each complete turn of the first arm (27) about the second axis (17) in a first rotation direction, the second arm (28) makes two turns about the third axis (29) in a second rotation direction opposite to said first rotation direction, and the pusher (8) makes three turns about the first axis (30) in the first rotation direction.

16. A device as claimed in claim 12, wherein said first and second axes (30, 17) are located the same distance from the third axis (29); said two arms (27, 28) being so located and connected to each other that, in use, said first and second axes (30, 17) are maintained at all times in the same plane parallel to said conveying surface (5).

17. A device as claimed in claim 12, wherein said control means (63) (are means for varying rotation of the pusher (8) about the first axis (30).

18. A device as claimed in claim 12, wherein said transmission assembly (21) comprises:

drive means (22) for rotating the first arm (27) about the second axis (17;

a first transmission (45) in turn comprising a first epicyclic gear train (46) presenting a first sun gear (44) coaxial with the second axis (17), and a first planet gear (37) coaxial with the third axis (29) and integral with the second arm (28); and a second transmission (52) in turn comprising a second epicyclic gear train (53) presenting a second sun gear (55) coaxial with the second axis (17), and a second planet gear (55) coaxial with the third axis (29), and a parallel-axis transmission (54) connecting the second planet gear (55) to the pusher (8).

* * * * *